United States Patent [19]

Haag et al.

[11] Patent Number: 4,983,693

[45] Date of Patent: Jan. 8, 1991

[54] PROCESS FOR PREPARING A ZIEGLER TYPE CATALYTIC SYSTEM AND PROCESS FOR PREPARING ULTRA HIGH MOLECULAR WEIGHT POLYETHYLENE

[75] Inventors: Roberto B. Haag; Jaime C. da Silva, both of Rio de Janeiro; Juan R. Q. Abarca, Petrópolis; Odyr do Coutto Filho, Rio de Janeiro, all of Brazil

[73] Assignees: Petroleo Brasileiro S.A. -Petrobras, Rio de Janeiro; Polialden Petroquimica S.A., Bahia, both of Brazil

[21] Appl. No.: 290,481

[22] Filed: Dec. 29, 1988

[30] Foreign Application Priority Data

Dec. 29, 1987 [BR] Brazil .................................. 8707098

[51] Int. Cl.$^5$ ................................ C08F 4/02
[52] U.S. Cl. .................................. 526/124; 526/156; 526/352; 502/132
[58] Field of Search ................................ 526/124, 156

[56] References Cited

U.S. PATENT DOCUMENTS 4,247,669  1/1981  Reginato et al. .................. 526/156
4,295,991 10/1981  Wristers ........................... 526/119 R

FOREIGN PATENT DOCUMENTS 8005302  7/1984  Brazil .
8005670  5/1985  Brazil .
2207931  6/1973  France .
1434264  5/1976  United Kingdom .

Primary Examiner—Patrick P. Garvin
Attorney, Agent, or Firm—Sughrue, Mion, Zinn, Macpeak & Seas

[57] ABSTRACT

Description of the preparation of a Ziegler type catalyst system through impregnation of a special alumina with 0.8–1.0% by weight of titanium derived from a dilute solution of titanium halide in n-hexane, the activator employed being triisobutylaluminum or triethylaluminum at an (Al)/(Ti) molar ratio of 2.5/1 to 80/1 in the catalyst. The catalyst system has high efficiency and yield, and leads to polyethylenes of excellent physical and mechanical properties which make it particularly suitable for use in engineering plastics.

9 Claims, No Drawings

PROCESS FOR PREPARING A ZIEGLER TYPE CATALYTIC SYSTEM AND PROCESS FOR PREPARING ULTRA HIGH MOLECULAR WEIGHT POLYETHYLENE

This invention concerns a process for preparing a Ziegler type catalytic system suitable for the making of ultra high molecular weight polyethylene. More specifically, the invention covers the preparing of a supported Ziegler catalytic system, the support being a special alumina impregnated with a small quantity of titanium tetrachloride in solution in an inert hydrocarbon. Upon coming into contact with the aluminum alkyl co-catalyst it creates an extremely active catalyst system for the polymerizing of ethylene, providing polyethylenes of ultra high molecular weight, in the range of 1 to 30 million, and with excellent mechanical properties.

To seek for catalytic systems for the polymerizing of alpha-olefins, has been a constant aim within research work, so as to secure substances with an ever more suitable specification for the final intended use, while industrial processes leading to such polyolefins become even more economical to carry out and less aggressive to the environment.

One of the approaches followed to achieve such purposes is through the preparing of a catalytic system where the inorganic support is impregnated with a transition metal halide and then placed next to an alkyl aluminum co-catalyst (activator). Such Ziegler systems are particularly suitable for the polymerizing of low pressure alpha-olefins in suspension, solution, or in a gas phase.

Out of the several known inorganic supports alumina has been the subject of many patents. Thus, in patent DE No. 1.214.653 the transition metal is reacted with a pyrogenic alumina support, there being hydroxyl groups in the surface of the alumina ready to react with the transition metal. However polymerization yield is low and the polymer has to be freed from catalyst and support wastes.

Bayerite prepared from sodium aluminate with carbon dioxide gas and calcined at 500° C. is the support described in patent FR No. 1.516.139, the process for preparing the alumina being laborious while yields are not high enough.

Under patent GB No. 1.553.778 a catalytic system is proposed which is made up of a combination of an organometallic substance and a transition metal compound supported on a carrier consisting of activated amorphous alumina containing Groups 2b, 3a, 6b and 8 metal salts with oxygenated, or unoxygenated inorganic anions, the alumina being then activated by calcining at 250°-700° C. Zinc, cadmium, etc., salts are used and the oxygenated anions are, for example, sulphate, phosphate, and as the unoxygenated, the halogens. The importance of the size of the pores of the support is stressed—from 1.2 to 2.0 $cm^3/g$—so as to enable the salts at the surface of the support to be absorbed more easily. It should be noted that calcining of the support takes place after the impregnation with salt. Other important features are surface area, about 200–300 $m^2/g$, and apparent density, from 0.2 to 0.4 $g/cm^3$. After impregnation with a salt, for instance, cobalt sulphate, an aluminum silicate type of support is treated with titanium tetrachloride at 120° C., while stirring, and then washed with an inert hydrocarbon. The titanium content within the support is 1.5% by weight. The polymerization process yields about 1600 g of polyethylene/g of catalyst/hour, while relative specific activity of titanium is 106,600 g of PE/g of titanium/hour. However the molecular weight of the polymers, or the control thereof is not mentioned.

Patent DE No. 2.123.357.8 describes a process to secure ultra high molecular weight polyethylene, catalyst being supported on an alumina with a high volume of pores—about 1.1 $cm^3/g$—a high surface area, and an average particle size of 40 to 200 micra, preferably about 100 micra. Impregnation of the alumina with the transition metal halide is done with pure halide, the Cl/Ti catalyst ratio being about 6.0.

Patent DE No. 1.745.074 describes a low pressure ethylene polymerization process, in which the catalyst system starts off with 30–80 micron size particles of alumina on which the transition metal halide is reacted, promoted by sodium hydride. The catalyst Cl/Ti ratio is from 2 to 3.

U.S. Pat. No. 4,247,669 describes the polymerization of ethylene with a high-yielding catalytic system based on alumina with a pore volume higher than 0.8 $cm^3/g$, a surface area of over 100 $m^2/g$, on which the transition metal halide is reacted, preferably undiluted, so that the halogen/transition metal ratio in the support is higher than the halogen/transition metal ratio in the transition metal compound, and preferably higher than 3:1, and so that the titanium content in the catalyst is higher than 1% by weight. In some cases the molecular weight of the polymer is over 1,000,000, thereby becoming ultra high molecular weight polymers.

Patent PI No. 8005670 of the applicant also describes a process for the securing of ultra high molecular weight polyethylene, in which for the catalytic support of the present invention, changes were introduced which enabled the improved aims to be achieved, described hereafter.

Though the literature on patents describes catalytic systems supported on high efficiency alumina and conveying ultra high molecular weight polyethylenes, the method employed to prepare such catalytic systems and to secure ultra high molecular weight polyethylenes can still be improved upon as regards greater yields, with a resulting drop in polluting wastes and smaller losses of noble metals, such as titanium.

Hence, one objective of this invention is that of preparing a Ziegler catalytic system supported upon a special alumina, belonging to the applicant, the particle size, volume of pores, distribution of volume of pores and surface area of which lead to a Ziegler catalytic system that is highly active, and which enables ultra high molecular weight polyethylenes to be obtained.

Another objective of this invention is that of preparing a catalytic system supported on such alumina, by means of an impregnating reaction with $TiCl_4$ in a dilute solution of aliphatic hydrocarbon, so as to maximize use of the transition metal in the support by avoiding unnecessary losses of such metal to the environment.

A further objective under the present catalytic system and process for the securing of ultra high molecular weight polyethylene is that the mechanical properties of the polymers secured, such as high impact and abrasion strength and high tensile strength, shall fit in with its end purpose as a plastic for engineering use.

To achieve these and other objectives, the catalytic system for this invention has the applicant's special alumina as a support, which was patented under Brazilian PI No. 8005302, and which is prepared as follows:

An analytic grade 216 g/l aqueous solution of aluminum sulphate and an analytic grade 230 g/l aqueous solution of ammonium bicarbonate are reacted at about 15°–20° C., pH being kept at 7.5 to 7.7 by adding ammonium hydroxide so as to create a compound known as ammoniacal dawsonite which contains 10–20% of residual sulphate ions. By calcining such dawsonite at 600°–800° C. for 4–10 hours an alumina is secured, of a surface area of 200–400 m$^2$/g, pore volume of 1.5–3.5 cm$^3$/g, and 85% of the pores of which are bigger than 100 Å. Such size of pores enables better absorption to take place of the titanium halide in the support impregnation reaction, and makes it much easier for the monomer to get to the active centers.

It was also found that this precursor, dawsonite, must not be washed, since this will eliminate the sulphate ions provided by the starter reagents, and a lack of such sulphate ions does great harm to the degree of activity of the final catalytic system.

The range of size of the pores of the aluminum support is also important, 85% of them should be over 100 Å in size in order to better absorb the transition metal halide and make it easier for the ethylene monomer to get to the active centers.

Thus, taken together, these various features of the support, namely, a port volume of 1.5 to 3.5, a surface area of 200–400 m$^2$/g, a residual content of sulphate ions of about 10–15% in the calcined alumina, and a pore size range in which 85% of the pores are larger than 100 Å, all make this alumina particularly suitable as a support for an extremely high activity Ziegler catalytic system, as illustrated in the examples.

Upon this support having such characteristics, an impregnation procedure, with a transition metal halide, will be carried out, preferably with titanium tetrachloride, in an inert hydrocarbon solution, preferably n-hexane, at a rate of from 1/200 to 1/300 by volume so that the final titanium content in the support shall be from 0.8 to 1.0% by weight, while the impregnating solution will contain just a slight surplus of transition metal halide in order do prevent any unnecessary losses of the noble metal, and to cut down on any threats to the environment.

Furthermore, the Cl/Ti ratio of the catalyst is close to 3.0 which bears witness to the tendency towards a predominance of highly active structures (—O—TiCl$_3$).

An aluminum alkyl is used as an activator, or cocatalyst, to make up the catalytic system, it being chosen out of triisobutylaluminum and triethylaluminum at a molar ratio of (Al/)(Ti) in the system, ranging from 2.5/1 to 80/1.

As regards creation of the catalytic system, this can be done according to two preferred ways, namely, the conventional system way and the in situ system way. For the conventional system n-hexane is added to the polymerization reactor, then the catalytic system is fed at room temperature, temperature raised to 80° C., and monomer thereupon put into the reactor. For the in situ system n-hexane is added at room temperature and then temperature is raised to 50° C., whereupon along with a small flow of ethylene a given quantity of the aluminum alkyl solution is fed in, and then the desired quantity of the catalyst in suspension, and the catalytic system is thereby created in situ, in the presence of the monomer. Whichever of the described ways is used the surrounding temperature rises up to 85° C. because of the exothermicity of the reaction and it is held at this figure by cooling.

For polymerization where it is desired to regulate the molecular weight, hydrogen is introduced at the desired pressure, before feeding of the monomer.

When done on an industrial scale, the applicant's process preferably undergoes a pre-polymerization stage, whereby the particles of the catalyst become surrounded by a fine film of polymer, and afterwards, the polymerization proper takes place.

For this invention hydrogen pressures in the range of 0–2.5 kgf/cm$^2$ were used, according to whether molecular weights of over or under 4 million were wanted.

The examples provided below are to be regarded as how this invention can be used without in any way limiting it.

EXAMPLE 1

This example illustrates one of the kinds of this invention, in which the catalytic system is created in the conventional way, the activator is triethylaluminum and without any hydrogen to control molecular weight.

25 g of alumina prepared as described above were impregnated with 1.0 ml of TiCl$_4$ in 300 ml of n-hexane. The impregnation reaction took place in a Parr 1 liter capacity reactor at about 80°–140° C., along with stirring and lasted 1 hour, after which the reacting medium was cooled down to 60° C., stirring stopped and catalyst allowed to settle, then solution was discharged and the catalyst was washed with 3×350 ml of n-hexane at 60° C. Finally the catalyst was suspended in 250 ml of n-hexane and kept in a glass flask. Titanium content, measured by molecular absorption, was 0.83%.

To polymerize the ethylene, a 3.78 liter (1 gallon) Parr reactor provided with stirrer and temperature control was heated up to 90° C. over 12 hours, and then drained off by vacuum and with dry argon in order to get rid of any residues whose dampness might harm the process.

n-Hexane was then introduced into the reactor at room temperature, followed by 2.6 ml of solution, 0.35M of the triethylaluminum activator in n-hexane, and 0.35 g of catalyst in suspension in n-hexane. Temperature was adjusted to 80° C. and the constant addition of ethylene started at a pressure of 14 kgf/cm$^2$, the reaction itself taking place at 85° C. owing to the exothermicity of the system.

After about 1 hour the reaction was stopped by removing pressure from the reactor and the polymer created in suspension was filtered and dried in an oven at 60° C. until weight became constant.

Activity of the catalytic system was estimated to be 180,700 g of polyethylene per gram of titanium per hour; density of the polymer was 0.935 g/cm$^3$, and average viscometric molecular weight was above 4 million. Apparent density of the polymer was 0.30 g/cm$^3$.

EXAMPLE 2

This example shows the effect of the impregnating method used, whether conventional or in solution, upon catalytic activity.

10 g of alumina were impregnated with 60 ml of pure TiCl$_4$, which created a 2.3% titanium content catalyst. Triethylaluminum was used as the activator, its molar ratio having been (Al)/(Ti)=10. Catalytic activity was 127,500 g of polymer per gram of titanium per hour, thus less than the activity in Example 1, when the support was impregnated with TiCl$_4$ in solution.

EXAMPLE 3

This example shows the effect of the activator upon process yield.

20 g of alumina were impregnated with 1.0 ml of $TiCl_4$ in n-hexane solution, which created an 0.8% by weight titanium content catalyst in relation to the alumina. The activator was triisobutylaluminum, and the ethylene polymerization process followed the same procedure as in Example 1. Catalytic activity was 150,600 g of polymer/g of Ti per hour. Another catalyst was prepared containing 0.9% of titanium also by impregnation in solution, the activator used having been triethylaluminum. Catalytic activity was 187.300 g of polyethylene/g of titanium per hour. This example shows that the activator has a certain amount of effect upon the activity, so that triethylaluminum performs better.

EXAMPLE 4

This example shows that where the catalytic system is created in situ, that is, in the presence of monomer ethylene even higher yields are achieved than in the conventional addition.

A catalyst was prepared as in Example 1, with 0.9% of titanium, in the presence of triethylaluminum as an activator, the catalyst system having been created in the presence of a slight flow of ethylene. Catalytic activity was 491,300 g of polyethylene/g of titanium per hour. Using this same catalyst but creating the catalyst system by the conventional way, 176,700 g of PE/g of titanium per hour were produced.

EXAMPLE 5

This example shows the effect of adding hydrogen upon the activity and the molecular weight of the polyethylenes produced.

A catalyst was prepared containing 1.2% of titanium, to which triethylaluminum was added, so as to create the catalytic setup in the conventional way. Yield was 171,430 g of polyethylene/g of titanium per hour and viscometric molecular weight was over 4 million, which prevented measuring the Melt Index.

The same system polymerized in the presence of 1.2 $kgf/cm^2$ of $H_2$ exhibited catalytic activity of 159,380 g of PE/g Tixh, an intrinsic viscosity of 10.1 dl/g and a melt index of 0.012 g/10 min, viscometric molecular weight having been 1.7 million. But in the presence of larger quantities of $H_2$, for instance 1.8 $kgf/cm^2$, yield was 151,350 g of PE/g Tixh, and intrinsic viscosity was 9.1 dl/g and melt index was 0.020, while viscometric molecular weight was 1.4 million. This serves to show that higher hydrogen pressures affect not only the molecular weight but also catalytic activity.

EXAMPLE 6

This example deals with the preparation of the prepolymer.

A catalyst was prepared containing 0.8% of titanium. The catalytic system was made with triethylaluminum as the activator and the prepolymerization reaction was done using 5.0 g of catalyst and at a monomer rate of flow of 470 ml/min, for 60 minutes, at 70° C., under 0.20 $Kgf/cm^2$ of $H_2$, thereby causing the particles of the catalyst to become enclosed in capsules of a fine film of polymer. Catalytic efficiency at prepolymerization was 6.5 g of prepolymer/g catalyst per hour and melt index was 1.48. With this prepolymer polymerization was undertaken with the aid of 2.1 g of prepolymer containing 0.33 g of catalyst. The (Al)/(Ti) ratio was 19.6, catalytic efficiency was 1,263 g PE/g of catalyst and per hour, catalytic activity was 157,900 g PE/g Tixh, and average viscometric molecular weight was over 4 million. Apparent density of polymer was 0.33 $g/cm^3$. A like system, at a (Al)/(Ti)=20.0 ratio and polymerized in the presence of 1,5 $kgf/cm^2$ of $H_2$ exhibited a catalytic efficiency of 908 g of PE/g cat.h, catalytic activity of 113,460 g PE/g Ti.h and average viscometric molecular weight of 2.4 million.

EXAMPLE 7

This example shows the very sound effect of adding to the catalytic system a small proportion of "L-55R RESIDUAL ACID NEUTRALIZER FOR POLYMERS" a product made by Reheis Chemical Company. This product which is a hydroxycarbonate of aluminum and magnesium exhibits antibinding properties, which improves the morphology of the polymer and brings about a sharp rise in apparent density.

A catalyst was prepared containing 0.84% of Ti with which a catalytical system was created with triethylaluminum as an activator. The "L-55R" product was added to the reactor right after feeding the activator and before adding the catalyst, the catalytic system having been created in the conventional way, that is, without any monomer. The antibinding mass/catalyst mass ratio was 2.3 and the Al/Ti ratio was 15.0, catalytic activity of 150,340 g PE/g Tixh having been obtained and having an apparent density of 0.38 $g/cm^3$.

The high apparent density of the polymers produced, as well as range of particle size, for 85% of the particles it was from 13 to 32 micrometers in size, ensure that the fluidity of the powder produced shall be excellent.

Such examples serve to show that the catalytic system developed by the applicant has high catalytic efficiency and a high rate of activity and that maximum use is made of the reactors employed while threats to the environment are cut down, thus leading to polyethylene polymers that do not need to go through any further stage of purification. In addition, the versatility of the system is sufficient to allow for variations and modifications without harming any of the end properties of the polymer.

Finally, physical and chemical data and typical physical properties of such polyethylene polymers prepared pursuant to this invention are given in Table I below.

TABLE I

| PROPERTIES | ASTM STAND. | | RANGE OF MOLECULAR WEIGHT ($M\nu$) | |
|---|---|---|---|---|
| | | | $4.0 \times 10^6$ | $1.0–3.5 \times 10^6$ |
| Intrinsic viscosity (dl/g) | D-1601 | ≧ | 18.0 | 7.7–16.7 |
| Density ($g/cm^3$) | D-1505 | | 0.932–0.937 | 0.940–0.942 |
| Melt Flow Index ($MI_{21}$) (g/10 min.) | D-1238 | | non-determinable | 0.010–0.020 |
| Tensile Strength at Break ($kg/cm^2$) | D-638 | | 370–490 | 290–330 |
| Elongation at Break (%) | D-638 | | 250–330 | 400–530 |
| Impact resistance IZOD (kg cm/cm) | D-256 | | Does not break | Does not break |
| Rockwell hardness (R scale) | D-785 | | 70–75 | 67–75 |
| Taber Abrasion (mg/1 000 ROI) | D-1044 | | 29–36 | 30–50 |
| Melting Point (°C.) | — | | | 133–137 |

TABLE I-continued

| PROPERTIES | ASTM STAND. | RANGE OF MOLECULAR WEIGHT (M$\nu$) | |
|---|---|---|---|
| | | > 4.0 × 10$^6$ | 1.0–3.5 × 10$^6$ |
| Branching content (CH$_3$/1000 C) | — | | <1 |
| Apparent density (g/cm$^3$) | D-1895 | | 0.30–0.40 |
| Titanium content (ppm) | — | | 10 |

We claim:

1. A process for preparing ultra high molecular weight polyethylene using a catalytic system in a hydrocarbon solvent which comprises bringing ethylene monomer into contact with the catalytic system in a hydrocarbon solvent and conducting said polymerization for about 1–3 hours in the presence of said catalytic system at a temperature of about 70°–85° C. and a pressure of about 14 kgf/cm$^2$ of said ethylene monomer wherein said catalytic system is prepared by the following process:
   (a) calcining an ammoniacal dawsonite at 600°–800° C. for 4–10 hours, which ammoniacal dawsonite is prepared by the reaction of aluminum sulphate and ammonium bicarbonate at a pH of 7.0 to 8.2, wherein said ammoniacal dawsonite is not washed between said reaction and said calcining, to thereby obtain an alumina with a pore volume of 1.5 to 3.5 cm$^3$/g, a surface area of 200–400 m$^2$/g, a residual sulphate ion content of about 10–15% in the calcined alumina and a pore size range in which 85% of the pores are larger than 100 Å;
   (b) reacting the resultant alumina with a solution of titanium halide in an aliphatic hydrocarbon at about 80°–140° C., for about one hour, so that the final titanium incorporated in the alumina will be present in an amount of 0.8 to 1.0% by weight to thereby obtain a catalyst composition; and
   (c) contacting the catalyst composition obtained in step (b) with a minor amount of an α-olefin under polymerization conditions in order to obtain a prepolymerized catalyst which contains from 500 to 1000 wt % of the pre-polymerized α-olefin based on the weight of the supported catalyst;
   (d) adding a co-catalyst to the product of step (c), which co-catalyst is triethylaluminum or triisobutylaluminum in an amount sufficient to provide an Al/Ti molar ratio between 2.5/1 and 80.0/1, and wherein the halide/Ti ratio in the catalytic system is about 3.0/1.

2. A process as claimed in claim 1, wherein the ammoniacal dawsonite is prepared at a pH of 7.5 to 7.7.

3. A process as claimed in claim 1, wherein incorporation of the titanium halide of step (b) is performed using a dilute solution of the titanium halide in an aliphatic hydrocarbon solvent at a ratio of about 1/300 by volume of titanium halide/aliphatic hydrocarbon solvent.

4. A process according to claim 1, wherein the halide is chloride and the chloride/titanium ratio is about 3.0/1.

5. A process as claimed in claim 11, wherein the catalytic system further comprises a hydroxycarbonate of aluminum and magnesium.

6. A process as claimed in claim 1, wherein the co-catalyst of step (d) is added in situ or before contact with the ethylene monomer.

7. The process as claimed in claim 1, wherein the activity of the catalytic system is between 120,000 to 500,000 g of polyethylene polymer per gram of titanium per hour.

8. The process according to claim 1, wherein the polyethylene obtained has a density of 0.932–0.942 g/cm$^3$, an apparent density of 0.30–0.40 g/cm$^3$, a Rockwell hardness of 67–75, an elongation of 250–530%, a tensile strength at break of 290–490 kg/cm$^2$, a melt flow index of from 0.01 to 0.02 g/10 min, a high resistance to impact and a molecular weight in the range of 1 million to 4 million in the presence of a molecular weight regulator and above 4 million in the absence of a molecular weight regulator.

9. A process as claimed in claim 1, wherein the titanium halide used in step (b) is titanium tetrachloride and the aliphatic hydrocarbon used in step (b) is n-hexane.

* * * * *